Patented Nov. 21, 1922.

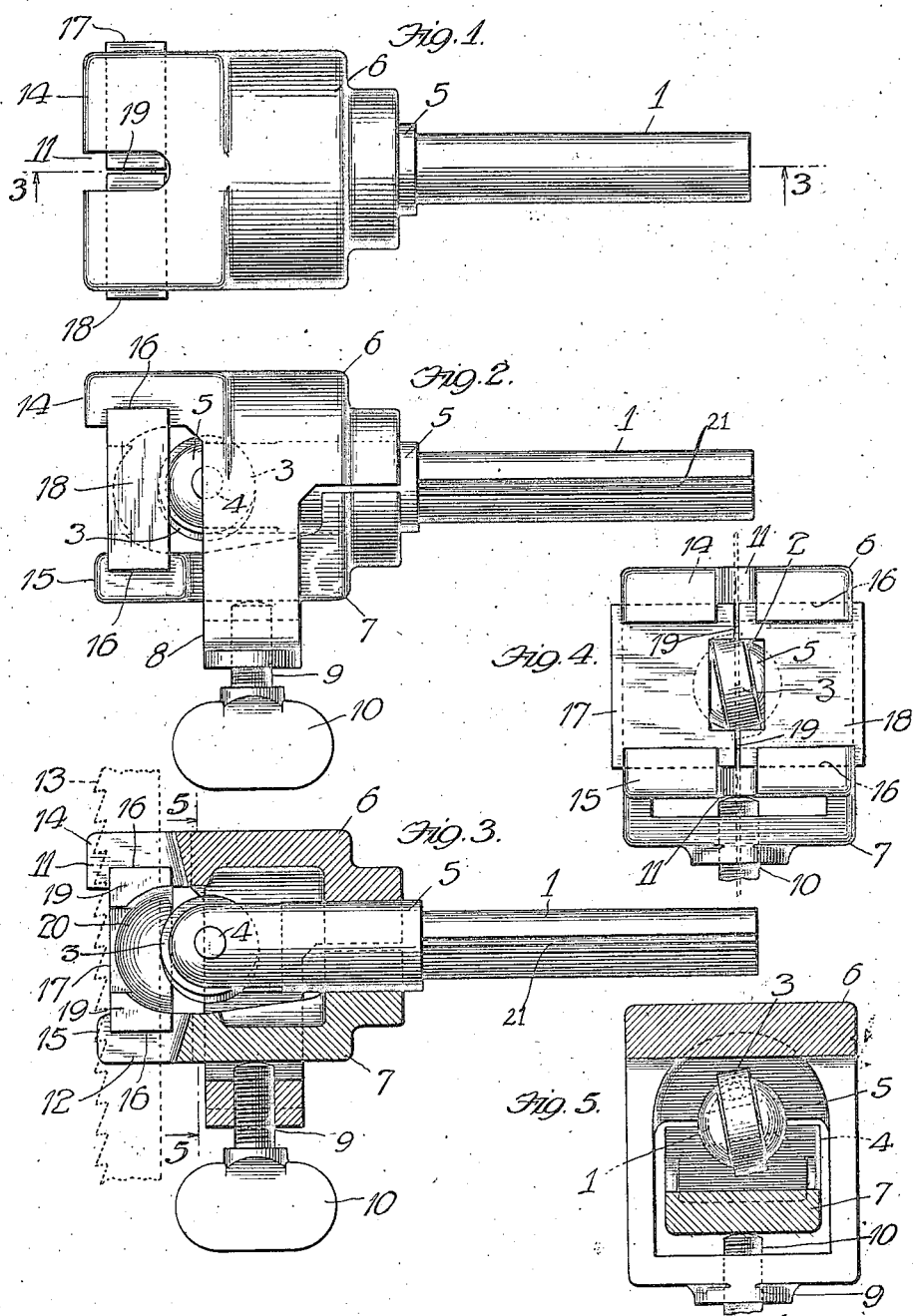

1,435,997

UNITED STATES PATENT OFFICE.

JOHN D. WALLACE, OF CHICAGO, ILLINOIS, ASSIGNOR TO J. D. WALLACE & CO., OF CHICAGO, ILLINOIS, A CORPORATION OF ILLINOIS.

BAND-SAW GUIDE.

Application filed August 4, 1921. Serial No. 489,723.

*To all whom it may concern:*

Be it known that I, JOHN D. WALLACE, a citizen of the United States of America, and a resident of Chicago, county of Cook, and State of Illinois, have invented certain new and useful Improvements in Band-Saw Guides, of which the following is a specification.

This invention relates to band saw guides, having the usual function of steadying and guiding the saw during its operation. One such device is usually mounted above the work table and another below the work table. In the accompanying drawing the guide alone is shown.

An object of the invention is to provide a structure of this character, having a small wheel in peripheral engagement with the rear edge of the saw to reduce friction upon a backward thrust of the saw, and to provide such a wheel properly inclined to have more than a mere point contact with the saw while, still under hard working of the saw, occasioning insufficient friction to heat the saw and cause it to become brittle and consequently shorten its life.

A further object is to provide both a rear edge guide and side guides, all of which may be adjusted according to saws of different thicknesses and widths and clamped in the adjusted position by means of a single adjustable screw.

The object of the invention is accomplished by the construction illustrated in the accompanying drawing, in which—

Figure 1 is a plan view of the band saw guide.

Fig. 2 shows the device in side elevation.

Fig. 3 is a longitudinal sectional view taken on the line 3—3 of Figure 1.

Fig. 4 is front end view of the clamp.

Fig. 5 is a sectional view taken on the line 5—5 of Fig. 3.

Band saw guides are as a rule supported by frame brackets above and below the work table. The present construction includes a cylindrical bar intended to be secured in the frame bracket and adjustably mounted therein, so as to be shiftable lengthwise in a horizontal direction and rotatably around its axis and then fixed in the desired position. This rod is forked at its forward end to receive the guide wheel for engaging the rear of the saw. The guide wheel may be in the form of a ball bearing such as is usually employed for taking a radial load. A pair of clamping jaws encircle the bar and carry forward of the guide wheel, a pair of side guide blocks, which are shiftable toward and away from the sides of the saw blade. The clamping jaws are so constructed as to be secured in the correct position on the bar and likewise clamp the guide blocks in adjusted position by means of a single winged set screw.

Referring to the drawings, supporting bar 1 is shown as provided with a recess 2 at its forward end for receiving wheel 3, which is rotatably mounted on a short shaft 4, passing through the forked forward end of bar 1. The wheel 3 is provided with ball bearings, and may be a standard radial load ball bearing. When in use bar 1 is so set that the wheel 3 will be approximately the inclination illustrated in Figs. 4 and 5, and thus, if an annular groove of semi-circular cross section is cut in the guide wheel or if such a groove is worn by the rear edge of the saw, a larger area of the back of the saw will engage the wheel, than if this wheel were set with its axis at right angles to the direction of the saw.

The bar 1 may be provided with a longitudinal groove 21 for engagement by a set screw on its supporting frame in order to definitely determine the angle of wheel 3. The angle at which this wheel should be set is less than that which would result in the saw crossing from side to side of the wheel 3 and, therefore, causing engagement with the edges of the wheel. The correct angle may be anything between zero degrees and an angle, the tangent of which is the width of the roller divided by the diameter of the roller.

The forward end 5 of bar 1 is shown as of somewhat larger diameter than the remainder of the bar and the enlarged part of the bar supports a pair of clamping jaws 6 and 7. The part 6 is provided with a yoke 8, which encircles the member 7 and has a threaded aperture 9, for receiving the winged set screw 10, the inner end of members 6 and 7 are cut away centrally as indicated at 11 and 12 in the drawings, to provide space for the passage of a saw 13 of any desired thickness. The forwardly extending portions 14 and 15 of members 6 and 7 are formed to provide a channel 16 for receiving laterally shiftable guide blocks 17 and 18. These blocks may be adjusted in the channel, so that their inner faces 19 may be caused to approach the saw to the desired extent. When all parts of the device are set as required for the particular width and thickness of the saw blade employed, such parts are clamped in the set position by means of screw 10. If the saw blade is of less width than that illustrated in the drawings, the parts 6 and 7, and the guide blocks 17 and 18 carried thereby, are shifted inwardly along the bar 1 until the wheel 3 engages the rear edge of the saw. The guides 17 and 18 are cut away adjacent to the wheel as indicated in Fig. 3 to make ample room for the wheel when a saw blade of minimum width is employed.

In the operation of the device, when it is all properly adjusted, the rear edge of the saw being in engagement with the wheel 3, this wheel serves to support the saw against a rear thrust with minimum friction. Wheel being a ball bearing and having an annual semicircular groove, as worn by the saw, engages the saw at more than a mere point and still without any appreciable rubbing action between the saw and the wheel. The guides 17 and 18 limit lateral motion of the saw, but are spaced to avoid frictional engagement with sides of the saw when no force in a lateral direction tends to displace it.

Although but one specific embodiment of this invention has been herein shown and described, it will be understood that numerous details of the construction shown may be altered or omitted without departing from the spirit of this invention as defined by the following claims.

I claim:

1. In a band saw guide, a supporting rod, a roller journaled on the end of said rod, and in position to engage the rear edge of a band saw, a pair of clamping jaws one above and one below the roller and supported by said rod, said clamping jaws being provided at their forward ends with a vertical slot for the passage of a band saw and with transverse guideways, and a pair of guide blocks, laterally movable in said guideways, and means for causing said clamping jaws to securely engage the rod and clamp the guide blocks in set position.

2. In a band saw guide, supporting rod and a roller journaled on the end of said rod, a pair of guide blocks, a support for said guide blocks provided with transversely extending ways for the guide blocks, and a single means for securing the support to the rod and the guide blocks to the support.

3. In a band saw guide, supporting rod, a roller journaled at the forward end of rod on an axis inclined to the horizontal, a pair of clamping members on said rod and encircling said roller, one of said clamping members being provided with a yoke passing around the remaining member, a set screw in said yoke and a pair of guide blocks mounted for adjustment in the lateral direction on said clamping members.

Signed at Chicago this 28th day of June 1921.

JOHN D. WALLACE.